INVENTOR.
KENNETH F. SINCLAIR
BY
ATTORNEYS

July 27, 1965
K. F. SINCLAIR
3,197,638
BACKSCATTER FLAW DETECTION SYSTEM
Filed Jan. 21, 1963
4 Sheets-Sheet 3
FIG. 3
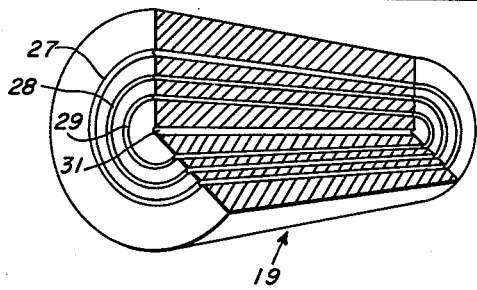
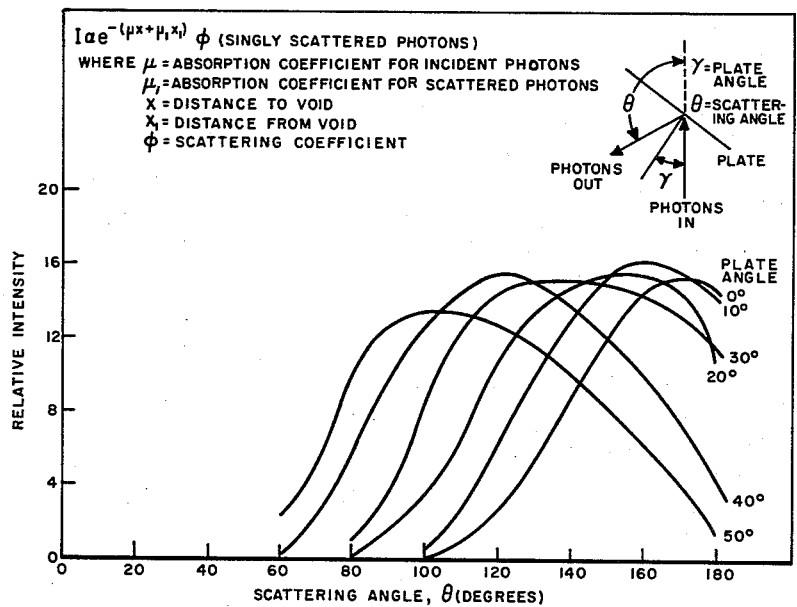
FIG. 4
INVENTOR.
KENNETH F. SINCLAIR
BY
ATTORNEYS ENERGY OF SCATTERED PHOTON AS A FUNCTION OF SCATTERING ANGLE ($\theta$)

SCATTERING COEFFICIENT AS A FUNCTION OF SCATTERING ANGLE

3,197,638
BACKSCATTER FLAW DETECTION SYSTEM
Kenneth F. Sinclair, Daly City, Calif., assignor to the United States of America as represented by the Secretary of the Navy
Filed Jan. 21, 1963, Ser. No. 253,009
6 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

The present invention relates to a non-destructive method and apparatus for detecting and locating material flaws and more particularly to such method and apparatus which require access to only one side of the test object and whose technique employs backscatter radiation resulting from Compton interactions in the test medium.

The conventionally accepted method for detecting material flaws is by means of film radiography. This method requires access to both sides of the test object since the X-ray machine has to be placed on one side of the specimen and the film, to record the image, on the opposite side. The resultant films, which will indicate flaws in the examined portion of the specimen, then have to be processed before decisions can be made regarding the section of material examined. In addition, cumbersome and heavy equipment has to be moved repeatedly to examine large objects, resulting in a large number of films at considerable expense in time and cost. In many cases existing radiographic technique cannot be used. In case of closed vessels, for example, access to both sides of the material is not always available, thus precluding use of this method.

The shortcomings of the conventional film radiography method for detecting flaws in materials have given impetus to the need for development of a practicable dynamic radiological testing method which will effectuate rapid and non-destructive testing for these material flaws. Two basic approaches suggest themselves which relate to the use of X- or gamma radiation coupled with scintillation detection. The one approach employs the "transmission" technique and the other employs the "backscatter" technique. Both techniques involve subjecting the under-examination portion of the material specimen to controlled incident radiation and then, by the use of scintillation detection, observing the characteristics of radiation emerging from the irradiated portion of the material specimen. In both instances variations in the number of emerging radiation photons detected per unit time which are not attributable to known dimensional changes in the test medium are indicative of anomalies, i.e., flaws, in the material specimen under test. In the transmission technique the flaw-indicating information is contained in the unscattered beam of gamma photons which have traversed the test medium. In the backscatter technique this flaw-indicating information is carried by degraded backscattered photons which emerge from the material specimen in a direction generally back toward the source of the incident radiation and which are produced as a result of Compton interactions in the test medium induced by the incident radiation. During inspection with either technique the material being tested can be kept in continuous motion or can be stepped in some systematic way to provide the coverage desired by the testing apparatus.

The "backscatter" technique of testing offers one cardinal advantage over the "transmission" technique in that, in this backscatter technique, all of the testing apparatus, including both the radioactive source of the radiaion used for irradiating the material being tested and the detection equipment employed to examine the resultant radiation emerging from the tested material, can be located on the same side of the tested material, that is, access is needed only to one side of the material under test. An illustrative example of a situation where the requirement of a single-side-only access meets practical needs is in the examination of long welds or welds on a closed vessel where both-side access is either impossible or extremely difficult.

Though the backscatter process has been in practical use for measuring the thickness of sheet materials, it has not previously been developed as a satisfactory technique for flaw detection. Failure to provide uniform sensitivity along with adequate resolution has thus far prevented practical flaw detection by use of this backscatter technique. The present invention solves this problem and produces a backscatter flaw detection system which provides both uniform sensitivity and adequate resolution.

The lack of uniform sensitivity, which has been the principal failure preventing prior backscatter flaw detection processes, arises from a physical limitation inherent in the backscattering process. In the backscattering process the primary and scattered photons are attenuated exponentially as a function of depth in the material (under test) while the scattering coefficient at any point in the material remains constant for fixed geometry, with the result that the sensitivity of a flaw detecting method employing "backscattering" deteriorates markedly with material sample thickness. At the heart of the solution of this difficulty is the unique detector collimator employed in the present apparatus. This detector collimator functions in such fashion that the operative detecting area, as seen from a point in the test medium, increases with depth in the medium in such a manner that the loss in sensitivity with depth is just offset by the increase in detector area. Thus the flaw testing method and apparatus of the invention achieve substantially uniform sensitivity as a function of depth in the material being tested. Absent such uniform sensitivity as related to depth, practicable flaw detection by the "backscatter" method would be impossible in materials of any appreciable thickness.

An object of the present invention is to provide a practicable "backscatter" method and apparatus for detecting flaws in materials.

Another object is to provide a "backscatter" method and apparatus for detecting flaws in materials wherein said method is characterized by uniform sensitivity of detection for varying depth locations of flaws in the material under test.

A further object is to provide a "backscatter" method and apparatus for detecting flaws in materials wherein said method is characterized by adequate flaw resolution and uniform detection sensitivity for various flaw depth locations in the material under test.

Other objects and many of the attendant advantages of this invention will be readily appreciated as the same becomes better understood by reference to the following detailed description when considered in conjunction with the accompanying drawing in which:

FIG. 1 portrays an illustrative embodiment of the invention;

FIG. 2 portrays a modified embodiment of the invention;

FIG. 3 is a perspective view, partially in section, of the detector collimator of the invention;

FIG. 4 is a graph showing the relationship between the relative intensity of singly-scattered photons and "scattering angle" ($\theta$) for various "plate angles;"

Any "backscatter" technique hinges basically upon what has become known as the Compton effect. Compton found that, by directing radiation of high frequency against material containing free electrons, collisions occurred between incident radiation photons and electrons in the material which manifested results similar to those produced by the collision between two perfectly elastic spheres. As a result of such collision a colliding photon is deflected from its original path and loses energy (is "degraded") and the electron colliding therewith is caused to recoil. It was found that there was a direct relationship between the degree of deflection of the incident photon and the loss of energy in the rebounding (deflected) photon. Some of the rebounding photons resulting from Compton interactions (between the irradiated material atoms and the incident radiation) will have such an angle of deflection (scattering) as to "bounce" back in the general direction of the incident photon beam. These will be "backscattered photons" which are employed in the backscatter technique used herein.

Figure 1:
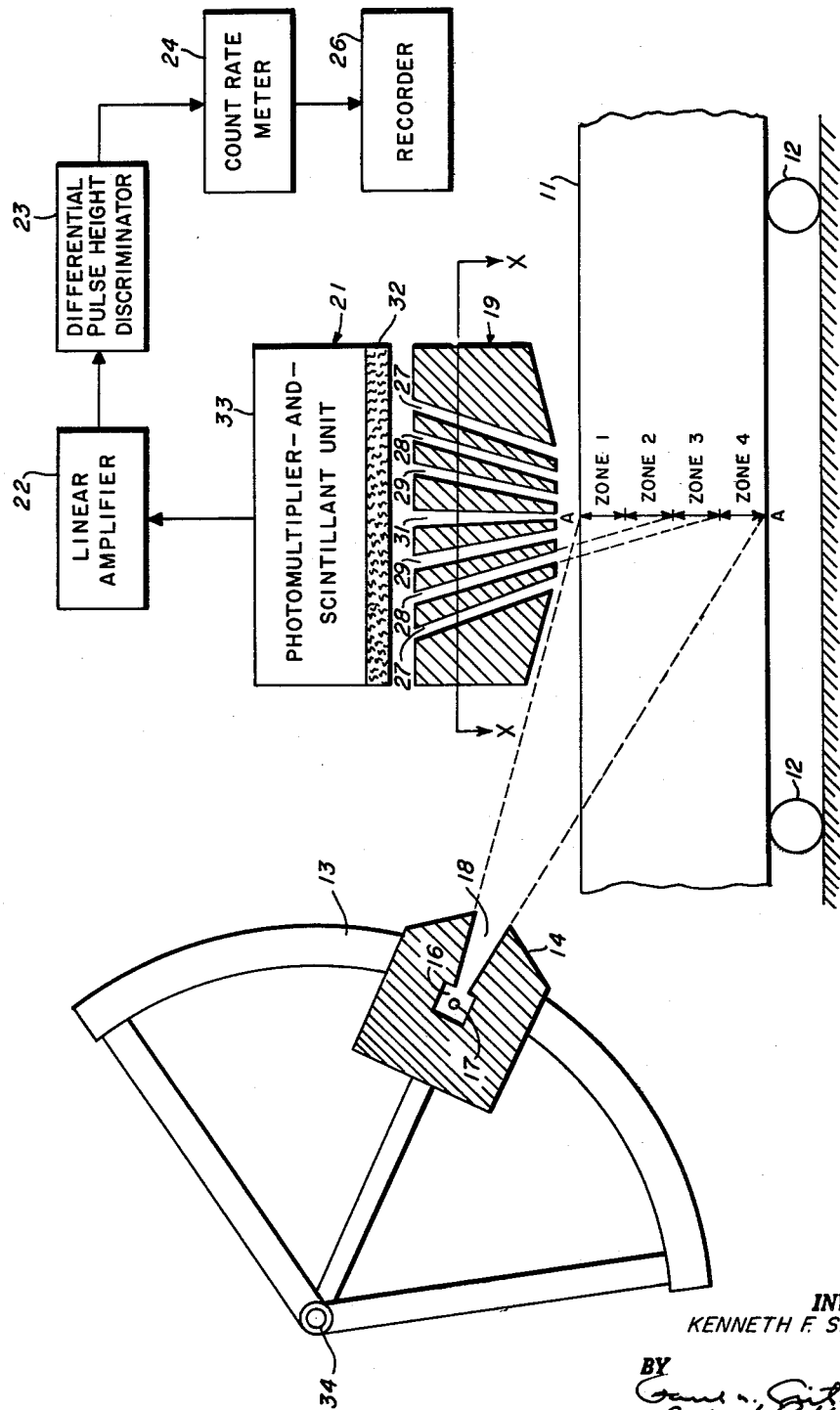

Referring now specifically to FIG. 1, a material specimen 11 such as a sheet of metal, for example, is supported in a conventional manner on supporting rollers 12 for examination travel under the flaw detecting apparatus and, in actual testing, may be advanced through the flaw testing zone in a continuous motion or stepped motion, as desired.

Mounted on a supporting frame 13 is a thick shield 14 in whose central recess 16 there is located a radiation source 17 which preferably emits a monochromatic radiation. It is not absolutely essential that a monochromatic radiation source be utilized; a radiation source having spectral distribution may be employed. Where a monochromatic radiation source is employed its energy level must be known and where a spectrally-distributed radiation source is employed it is essential to know its uppermost spectral level of energy. Shield 14 is formed with a relatively long passageway 18 therein leading from its central recess 16 and is of such material as lead to strongly absorb all radiations emitted by radiation source 17 except those which pass from central recess 16 by way of passageway 18. Passageway 18 acts to collimate the emitting radiation from source 17 into a beam of radiation which will be incident upon the material specimen 11. FIG. 1 shows the orientation of the incident beam of radiation for investigation of possible flaw presence substantially along the line A—A which runs from one side of the material specimen to the other. Although FIG. 1 may give the impression that the incident radiation beam from radiation source 17 is of substantial breadth, in reality the actual beam breadth is not great. This can readily be seen when it is realized that a typical material specimen under test will be on the order of an inch or less in thickness.

Situated on the same side of the material specimen 11 as the radiation source 17 is a detection-and-recording apparatus which comprises, in combination, a focusing detector collimator 19, a scintillant-and-photomultiplier unit 21, a linear amplifier 22, a differential pulse height discriminator 23, a count rate meter 24 and a recorder 26.

Figure 2:
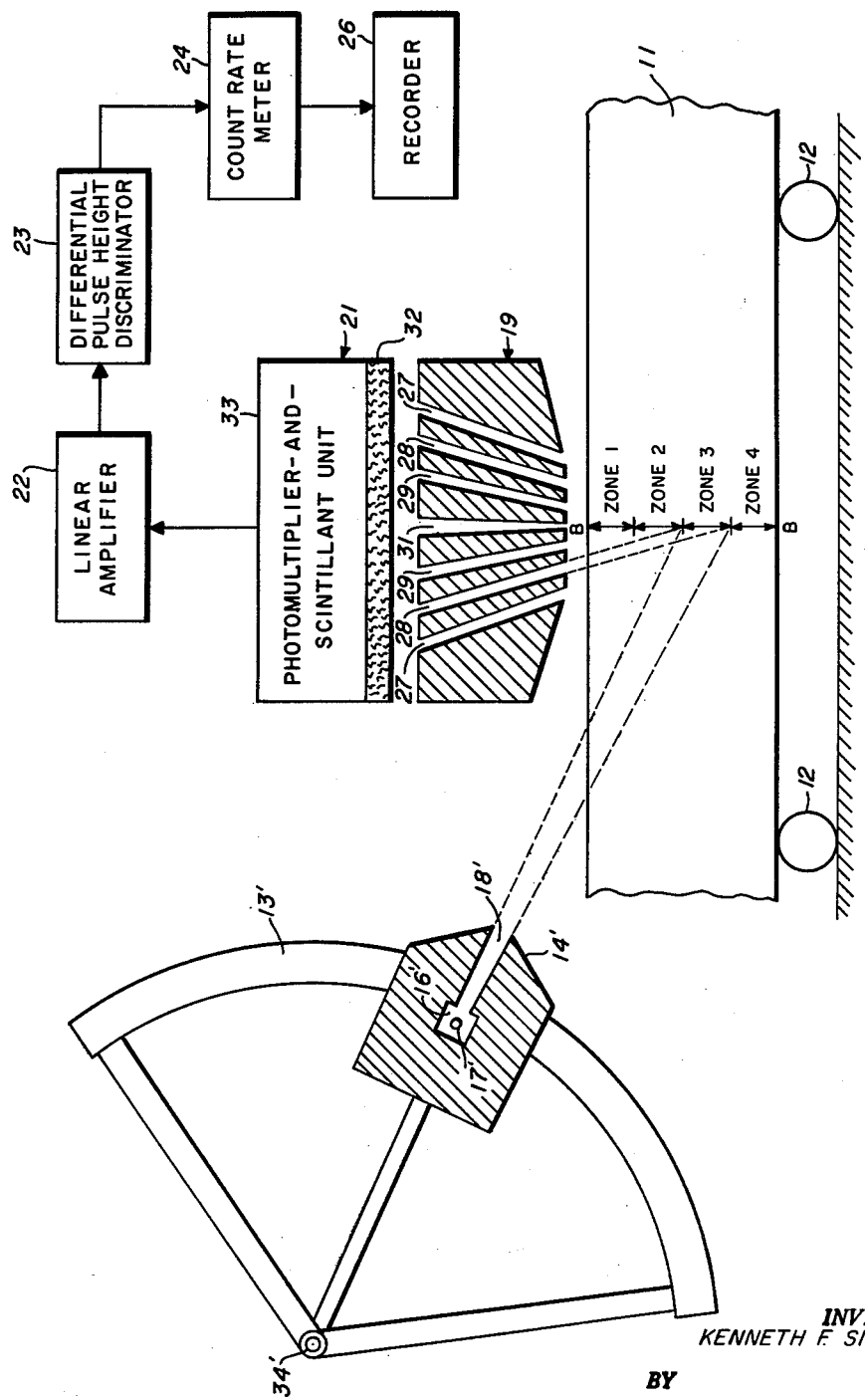

Detector collimator 19 is shown in vertical sectional view in FIG. 1 (and in FIG. 2) and in perspective view, with a sectional cutout, in FIG. 3. This detector collimator 19 is made of lead and is formed with a series of passageways therein which run the length of its longitudinal dimension (vertical dimension as seen in FIGS. 1 and 2). The majority of the passageways are each annular in cross-section as would be seen for example along the line X—X of FIG. 1 and, in longitudinal view, each takes the configuration roughly of a frustum of a cone. The one exception is the central passageway which is cylindrical in shape and has a circular cross-section. As seen in FIGS. 1, 2, and 3, this detector collimator 19 is shown having a total of four passageways the outer three being numbered 27, 28, and 29, respectively and the central passageway being numbered 31. The specific number of passageways shown is illustrative only and, subject to the requirements later described herein, the detector collimator 19 can be formed with a different given number of passageways.

The passageways 27, 28, 29 and 31 of detector collimator 19 act to pass certain backscattered photons emerging from material specimen 11 to the scintillant-and-photomultiplier unit 21. These backscattered photons, passed via the passageways of detector collimator 19, will impinge upon the scintillant portion 32 of the scintillant-and-photomultiplier unit 21. The scintillant-and-photomultiplier unit 21 consists of a conventional scintillant portion 32 and a conventional photomultiplier 33 mated for cooperative action. The scintillant portion 32 consists of any conventional scintillant material such as anthracene or solium iodide or any other substance adapted to produce light as an incident of interaction between the scintillant material and radiation photons incident thereupon. Scintillant portion 32 is mounted in close proximity to the photon-exit end of the passageways 27, 28, 29 and 31 of detector collimator 19, so that the backscattered photons which travel through these passageways from the material specimen 11 will impinge upon the scintillant material and produce therein light impulses whose individual intensities are proportional to the energy level of the creating impinging photon.

Photomultiplier 33 acts as a light detector-and-transducer to transform the light pulses originating in the scintillant portion 32 to corresponding electrical impulses with the result that the light pulses produced in the scintillant material by the impinging backscattered photons are reflected at the output of the scintillant-and-photomultiplier unit as electrical pulses whose individual amplitudes conform to the intensities of the originating light pulses and therefore to the energy levels of the impinging backscattered photons which originated these light pulses.

A linear amplifier 22, connected to the output of the scintillant-and-photomultiplier unit 21, receives the various electrical pulses therefrom and amplifies them in a linear fashion so as to preserve the relative amplitude pattern of these electrical signal pulses from the scintillant-and-photomultiplier unit 21.

From the output of linear amplifier 22 the amplified signal pulses derived from the scintillant-and-photomultiplier unit 21 are fed to a differential pulse height discriminator 23 which consists of a conventional amplitude-discriminating network which will selectively transmit only those signal impulses which fall within a certain predetermined narrow range of magnitudes. Later discussion herein will deal with the criteria controlling the amplitude range determined for the favored signal impulses which will be passed by this differential pulse height discriminator 23.

Such electrical impulses as fall within the transmittable amplitude range of pulse height discriminator 23 are then passed to a conventional count rate meter 24 where the incoming pulse rate is averaged and passed on to a conventional recorder 26 where this averaged count rate is portrayed graphically.

Referring now to the FIG. 2 embodiment which portrays a modification of the invention, the apparatus is essentially the same as is shown by FIG. 1. It differs from the FIG. 1 embodiment, however, in that the collimated beam of radiation coming from source 17' is narrower than the like beam coming from source 17 of the FIG. 1 embodiment. In the FIG. 1 embodiment the material-incident radiation beam is intended to cover the complete expanse defined by zones 1 through 4 located along the line A—A, as shown. The like radiation beam of FIG. 2, however, is intended to cover at one time only one of the zones (1 through 4) located along the line B—B, as shown. During the flaw testing method employing the FIG. 2 embodiment, at various times it will be desired to irradiate each of the individual zones along the line B—B. For this reason the radiation-source-containing shield 14' is adapted to be swung about the pivotal point 34' on frame 13' to the selected position for irradiation of any of the zones (1–4) as desired.

The flaw detection system defined herein achieves the high degree of sensitivity and of resolution, which make for a practicable system, by the use of a predetermined "best scattering geomery" which, in effects entails use of a discriminating geometry-energy relationship interrelating the directional radiation source, the material specimen under test and a selective detector collimator (as evidenced by elements 14–17, 11, and 19 of FIG. 1, for example). This use of a "best scattering geometry" in the flaw detection system herein is grounded upon the known geometry-energy probability relationships associated with Compton interactions and has, for its objective, the detection by the apparatus of the maximum possible number (highest scattered intensity) of the significant backscattered photons which carry the flaw-indicating information about that portion of the material specimen under test. With a knowledge of the radiation source energy level, of the type of material being tested, and of the maximum thickness which is expected to be encountered for the test material, a "best geometry" can be ascertained which will yield this "greatest scattered intensity." This preselected "best scattering geometry" for the system results in use of a preselected angle of incidence of the radiation beam (from the known energy level radiation source) with respect to the material specimen and a preselected backscattering angle, which is operatively established (by selective detector collimation) to pick up only those backscattered photons of a specific energy level.

Figure 5:
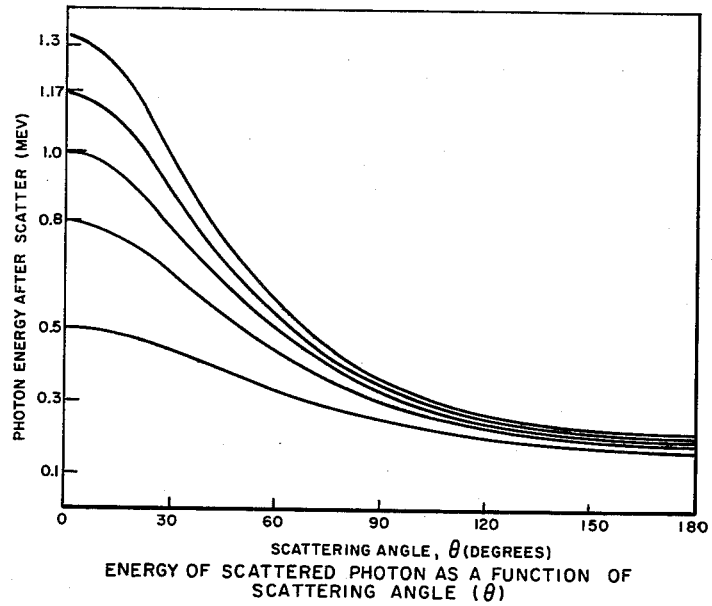
FIG. 5 is graph portraying the energy of scattered photons as a function of scattering angle ($\theta$)
Figure 6:
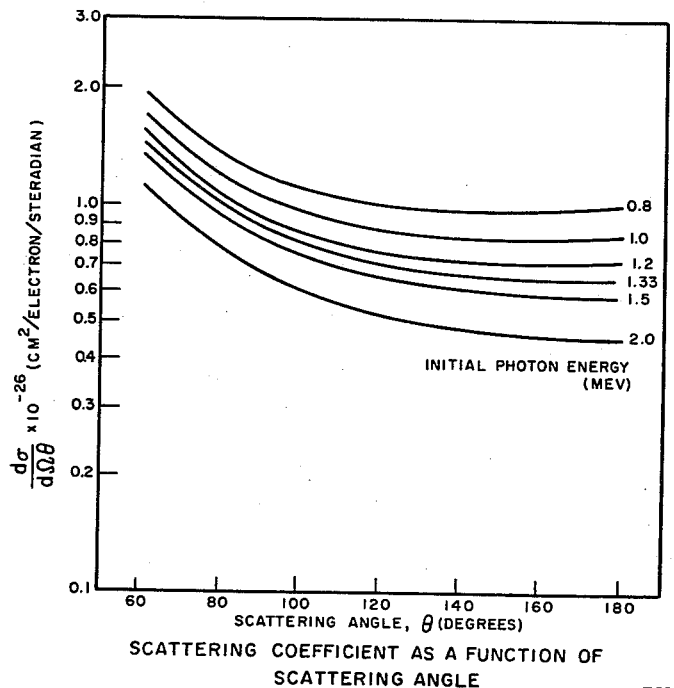
FIG. 6 portrays scattering coefficient as a function of scattering angle.

The determination of the "best scattering geometry" entails an analytical consideration of the phenomena associated with Compton interactions and, as developed herein, a major simplification of the actual backscattering phenomena. As a result of Compton interaction, there will be produced both singly and multiply scattered photons. A general solution for "best scattering geometry" which would dwell upon both singly and multiply scattered photons is extremely difficult, requiring use of Monte Carlo techniques and machine computation. It has been found, however, that, by confining the detection system herein to a consideration of only singly scattered photons, with good source and detector collimation, the necessary flaw-indicating information would be conveyed by the singly scattered photons and that a precise geometry ("best scattering geometry") could be established that would correspond to a particular energy level. With this simplification the scattered intensity, $$I = k e^{-(\mu x + \mu_1 x_1)} \phi \qquad \text{Equation (1)}$$

where $\mu$ = the absorption coefficient in the medium for the incident beam $x$ = distance for the incident beam from the entering surface to the point of interest in the medium $\mu_1$ = the absorption coefficient in the medium for the scattered beam $x_1$ = distance from the point of interest in the medium to the exit surface $\phi$ = scattering coefficient for the given angle $e$ = the well-known natural logarithm base $k$ = constant The objective of the "best scattering geometry" is to achieve detection, by the detection portion of the apparatus, of the maximum number of the singly backscattered photons of the energy level of interest. As can readily be seen from FIG. 4, which portrays scattering intensity versus scattering angle for various plate angles, there will be a number of possible "best geometries" which can be selected for use in the detection system, for you will note that a number of plate angle-scattering angle possibilities yield high relative scattering intensities that are substantially equivalent in magnitude. Note that the upper right hand portion of the graph defines the conventional "scattering" and "plate" angles. "Plate," as used here, is equivalent to the surface of the material specimen which faces the test apparatus. Of the variables noted above (Equation 1) which determine the relative scattering intensity, $x$ and $x_1$ should be clear; they indicate the noted distances to the point in the material specimen being tested for flaw presence. $\mu$ and $\mu_1$ relate to the linear absorption coefficients for the type of material under test, as related to the incident radiation beam energy level and the scattered photon beam energy level, respectively. As previously noted, the energy level of the radiation source (17) will be predetermined and, accordingly, will establish the energy level of the incident beam. The energy level of the scattered beam can be ascertained for all angles of interest by the use of the well known Compton Scattering Equation which expresses a relationship (for Compton interactions) between the incident beam energy, the scattered beam energy and the angle of scattering involved.

$$E_2 = \frac{E_1}{1 + \frac{E_1}{mc^2}(1 - \cos \theta)} \qquad \text{(Equation 2)}$$

where $E_1$ is the incident beam energy
$E_2$ is the scattered beam energy
$\theta$ is the angle of scattering
$mc^2$ is the rest energy of the colliding electron and is equal to 0.511 mev. FIG. 5 herein portrays scattered beam energy values as a function of scattering angle and incident beam energy. The last variable in the scattering intensity equation (Equation 1) is the scattering coefficient, $\phi$, for the given angle of scattering. This scattering coefficient $\phi$ is determined by the probability of scattering for the particular geometry involved and can be mathematically ascertained by using the well-known Klein Nishina Formula.

Referring now back to the FIG. 1 embodiment, the flaw detection apparatus is set up for examination of flaw presence along the profile defined by the line A—A in the material specimen 11. The incident radiation beam covers the entire length of this line A—A which is shown made up of four equally spaced zones, labelled zones 1, 2, 3 and 4, respectively. The detector collimator 19, previously described, is positioned with its center-line coincident with the profile line A—A in the material specimen 11 and the photon-entry end of the detector collimator 19 is placed close to the surface of material specimen 11 in order to keep air gap distance between the surface of material specimen 11 and the entry-end of the collimator 19 to an operative minimum to avoid a distance factor error which this air gap tends to introduce into the system. Detector collimator 19 is oriented with respect to the material specimen portion under test and the incident radiation beam to satisfy a "best scattering geometry" predetermined for the testing situation at hand. Each of the zones defined along profile line A—A of material specimen 11 is operatively associated with a different scattered photon-receiving passageway in the collimator 19. Photons scattered from zone 1 pass through passageway 31; photons scattered from zone 2 through passageway 29; photons scattered from zone 3 through passageway 28; and photons scattered from zone 4 through passageway 27. With the "best scattering geometry" applied to the detector collimator as a whole, it can be seen that each of the operative passageways of collimator 19 will be associated with a slightly different specific energy level of singly scattered photons, but the variation due to the difference in scattering angles involved for the various zones along line A—A and their respective operative collimating passageways in detector collimator 19 is not critical. It merely means that the photons passed through the passageways of detector collimator 19 to excite scintillant 32 will represent a narrow range of energy levels rather than a single energy level. This narrow range of different energy level photons (as determined by the geometry of the system) passed by the collimator 19 to excite scintillant 32 will originate electrical impulses of corresponding narrow range variation in amplitude. It is this range of amplitude signals which differential pulse height discriminator 23 is designed to pass to count rate meter 24 and recorder 26. Pulse height discriminator 23, in acting to reject the electrical signal product of unwanted back-scattered photons (of non-qualifying energy levels), further assists in confining the operation of the system solely to singly scattered photons, for the multiply scattered photons will fall considerably outside qualifying energy levels.

Detector collimator 19 not only performs the function previously described, but it also accomplishes a depth compensation function which provides the flaw detection system with substantially uniform sensitivity as a function of depth in the material specimen under test. Since primary and scattered photons are attenuated exponentially as a function of depth in the material under test, while the scattering coefficient at any point in the material remains constant for fixed geometry, the sensitivity of a backscatter system for flaw detection will deteriorate markedly with increase in specimen thickness unless this effect is compensated for. Detector collimator 19 effectuates this required compensation. As previously noted, each of the passageways in detector collimator 19 is operatively associated with a different zone along the line A—A in the material specimen 11. The number of passageways in detector collimator 19 coincides with the number of zones in the test region and the focal point for each passageway is the center of its associated zone.

The end result of the detection apparatus is to record the total number of qualifying (of qualifying energy level) scattered photons which are detected per unit time. The cross-sectional area of the individual passageway will, of course, be a determinant of the total number of qualifying photons passed by such passageway to excite the scintillant portion 32 to originate an equal number of electrical impulses for recording by count rate meter 24 and recorder 26. It can readily be seen from FIG. 1, for example, that, as the point of interest progresses in depth from the top of the material specimen downwardly, going from zone 1 through zone 4, the cross sectional area of the operative passageway increases. This increase in cross sectional area of the passageway associated with a greater depth of the point of interest can be made to just compensate for the loss in scattered intensity as a function of depth. With this approach, sensitivity can be made substantially uniform throughout the depth of the material specimen under test. The passageway construction can be made to conform the equation $$K = \frac{A}{r^2} e^{-(\mu x + \mu_1 x_1)} \quad \text{(Equation 3)}$$

where $A$ = detector area exposed
$r$ = distance from point of interest to the scintillant portion 32
$\mu, \mu_1, x$ and $x_1$ are as defined for Equation 1, above A small detector area, $A$, is arbitrarily chosen for the first zone. This, then, defines a $K$ which is used for all of the other zones. It will be noted that use of a greater number of zones (and associated passageways in detector collimator 19) will lead to a greater degree of approximation.

With the use of the embodiment portrayed in FIG. 1 the whole material specimen can be continuously scanned as it is kept in continuous travel past the point of examination. A variation in the number of energizing radiation photons detected per unit time not attributable to known changes in the test medium will be indicative of anomalies, i.e., flaws somewhere along the line A—A in the material specimen under test. The FIG. 1 embodiment, geared to fast inspection, will not spatially anomalies, i.e., flaws somewhere along the line A—A but merely that such a flaw is present along such a profile line.

The FIG. 2 embodiment, on the other hand, is not geared to as fast an inspection, for each zone depth level is intended to be investigated at a time (it will be noted that the irradiating beam only traverses an individual zone depth). This, of course, necessitates shifting of the incident beam from one zone to the next throughout the course of the examination, but when a flaw is located along such a profile line as B—B, for example, its presence will be spatially limited to the specific zone then under irradiation. Also, when the FIG. 2 embodiment is being employed, the operative collimating portion of detector collimator 19 will be confined to the passageway associated with the particular zone being examined (irradiated) and pulse height discriminator 23 will be designed to pass only what will be substantially the specific energy level determined for the operative passageway by the "best scattering geometry" of the system associated with the zone in use and its operative passageway and the incident radiation characteristics.

Obviously many modifications and variations of the present invention are possible in the light of the above teaching. It is intended to cover all changes and modifications of the embodiments set forth herein which do not constitute departures from the spirit and scope of the invention.

What is claimed is:

1. Apparatus for the detection of flaws in a material specimen comprising:

irradiating means, located adjacent said material specimen, for subjecting a selected localized zone in said material specimen to a directionally-incident collimated beam of radiation of known energy level;

selective detecting means, located on the same side of said material specimen as said irradiating means, and selectively positioned for selectively detecting certain singly-scattered backscattered photons resulting from Compton interactions induced in the selected localized zone of said material specimen by said incident beam of radiation, the selectively detected backscattered photons being those which present a maximum scattered intensity to said detecting means according to the dictates of the equation $I = ke^{-(\mu x + \mu_1 x_1)} \phi$ wherein $I$ is the scattered photon intensity, $\mu$ is the absorption coefficient in the material specimen medium for the incident radiation beam energy level, $x$ is the distance for the incident radiation beam from the surface where said incident beam enters said material specimen to the localized zone in said material specimen, $\mu_1$ is the absorption coefficient in the material specimen medium for the energy level of the beam of backscattered photons, $x_1$ is the distance from the localized zone in said material specimen to the surface location where the beam of backscattered photons exits from said material specimen, $\phi$ is the scattering coefficient for the given angle of scattering as defined by the intersection of said incident beam of radiation and said beam of backscattered photons, and $k$ is a constant;

transducers means connected to said selective detecting means, said transducer means receiving and converting the selectively-detected backscattered photons to electrical impulses whose relative amplitudes are representative of the individual energy levels of the selectively-detected backscattered photons;

counting means, connected to the output of said transducer means, for counting per unit time the total number of the photon-derived electrical impulses produced by said transducer means in response to the selectively-detected backscattered photons, a change in the count rate of said photon-derived electrical impulses which is not attributable to known changes in said material specimen being indicative of the presence of a flaw in the selected localized zone of said material specimen;

depth-change-compensating means, located on the same side of said material specimen as said irradiating means, for varying the operative capacity of said selective detecting means, whereby said detecting means detects backscattered photons of the selected group in such fashion that the loss in sensitivity of said detection apparatus with increase in depth, in said material specimen, of the point of interest is just offset by an increase in the selected-photon detecting capacity of said detecting means.

2. The apparatus of claim 1 further characterized by a differential pulse height discriminating means intermediate said transducer means and said counting means for passing to said counting means from said transducer means only those electrical impulses which have amplitudes corresponding to the energy levels of the singly-scattered backscattered photons produced in said irradiated localized zone and which are selectively detectable by said selective detecting means.

3. Apparatus for the detection of flaws in a material specimen comprising:

irradiating means, located adjacent to said material specimen, for subjecting a selected localized portion of said material specimen as defined by a series of sequentially contiguous individual zones to a directionally-incident collimated beam of radiation of known energy level;

photon collimating means, having a photon-entry end and a photon-exit end and adapted to be located on the same side of said material specimen as said irradiating means, with its photon-entry end in close proximity to the selected localized portion of said material specimen, for jointly performing the function of selectively passing from its photon-entry end to its photon-exit end certain of the singly-scattered backscattered photons resulting from Compton interactions induced in the selected localized portion of said material specimen by said incident beam of radiation, the selectively-passed backscattered photons being those from among the entire group of the Compton-interaction-produced backscattered photons emerging from the selected localized portion of said material specimen which present, to the photon-entry end of said collimating means, a maximum scattered intensity according to the dictates of the equation $I = k e^{-(\mu x + \mu_1 x_1)} \phi$ wherein I is the scattered photon intensity, $\mu$ is the absorption coefficient in the material specimen medium for the incident radiation beam energy level, $x$ is the distance for the incident radiation beam from the surface where said incident beam enters said material specimen to the selected localized portion of said material specimen, $\mu_1$ is the absorption coefficient in the material specimen medium for the energy level of the beam of backscattered photons, $x_1$ is the distance from the selected localized portion of said material specimen to the surface location where the beam of backscattered photons exits from said material specimen, $\phi$ is the scattering coefficient for the given angle of scattering as defined by the intersection of said incident beam of radiation and said beam of backscattered photons, and $k$ is a constant and the function of compensatingly varying the operative photon-passing capacity of said collimating means in such fashion as to nullify the shift in characteristic among the selectively-detected back-scattered photons which is traceable to differences in depth in said material specimen of the points of origin of individual back-scattered photons and which when left uncorrected causes a loss in the sensitivity of said detection apparatus as a function of depth in said material specimen;

scintillation means, located in close proximity to the photon-exit end of said collimating means, for receiving from the photon-exit end of said collimating means the backscattered photons selectively passed by said collimating means and converting these selectively-passed backscattered photons to light pulses whose individual intensities correspond to the energy levels of the individual photons from which these light pulses are derived;

photomultiplier means in mated operative position with said scintillation means, for receiving and converting the light pulses produced by said scintillation means into corresponding electrical impulses whose individual amplitudes correspond to the individual intensities of the light pulses from which they are derived;

counting means, connected to the output of said photomultiplier means, for counting per unit time the total number of the photon-derived electrical impulses produced by the sequential operation of said scintillation means and said photomultiplier means in response to the backscattered photons selectively passed by said photon collimating means, a change in the count rate of said photon-derived electrical impulses being indicable of the presence of a flaw in the selected localized portion of said material specimen.

4. The apparatus of claim 3 further defined by a differential pulse height discriminating means, intermediate said photomultiplier means and said counting means, for selectively passing to said counting means from said photomultiplier means only those electrical impulses of amplitudes corresponding to the energy levels of those backscattered photons which are selectively passed by said photon collimating means.

5. The apparatus of claim 3 wherein said photon collimating means comprises a member which is composed of material which strongly absorbs radiation and which is formed with a series of passageways running therethrough, each of said passageways being symmetrically disposed with respect to a common axis, each of said passageways being operatively associated with one of the individual zones in the selected localized portion of said material specimen and each of said passageways having a focal point substantially in the center of its associated material specimen zone, the photon-passing cross-sectional areas of each of said respective passageways being interrelated in accordance with the equation $$K = e^{-(\mu x + \mu_1 x_1)} \frac{A}{r^2}$$

wherein A is the exposed area of said scintillation means, $r^2$ is the distance from the point of interest in the material specimen to the scintillation means, K is a constant, $e$ is the natural logarithm base, $\mu_1$ is the absorption coefficient in the material specimen medium for the energy level of the beam of scattered photons which are backscattered from the material specimen zone associated with the given passageway, $x_1$ is the distance from the center of the associated material specimen zone to the photon exit surface of said material specimen as measured along the line joining the center of the given passageway with the center of its associated material specimen zone, $\mu$ is the absorption coefficient in the material specimen medium for the energy level of said incident beam of radiation and $x$ is the distance measured along said incident radiation beam between the location where said incident radiation beam enters the surface of said material specimen and the center of the material specimen zone associated with the given passageway.

6. The apparatus of claim 5 wherein the centrally-disposed passageway in said member is substantially cylindrical in shape and has said common axis for its center line and the balance of said passageways are substantially in the shape of conical frusta.

References Cited by the Examiner

UNITED STATES PATENTS 2,934,652  4/60  Caldwell _____ 250—83.6
2,997,586  4/61  Scherbatskoy _____ 250—83

JAMES W. LAWRENCE, *Examiner.*

RALPH G. NILSON, *Primary Examiner.*